United States Patent [19]
Kemper

[11] Patent Number: 5,144,857
[45] Date of Patent: Sep. 8, 1992

[54] STEERING MODE SELECTOR ASSEMBLY

[75] Inventor: Philip T. Kemper, Fargo, N. Dak.

[73] Assignee: Case Corporation, Racine, Wis.

[21] Appl. No.: 597,449

[22] Filed: Oct. 12, 1990

[51] Int. Cl.$^5$ .............................................. G05G 1/04
[52] U.S. Cl. ........................................ 74/523; 74/97.1;
74/484 R; 74/527; 280/91
[58] Field of Search .............. 74/491, 523, 97.1, 475,
74/527, 484 R; 180/315, 332, 79.3, 79.4; 280/91

[56] References Cited

U.S. PATENT DOCUMENTS

| | | | |
|---|---|---|---|
| 902,560 | 11/1908 | Coldwell | 74/475 |
| 1,681,893 | 8/1928 | Barshell | 280/91 |
| 2,234,888 | 3/1941 | Blagden | 280/91 |
| 2,339,205 | 1/1944 | Tapp | 280/91 |
| 2,411,570 | 11/1946 | Hawkins | 280/91 |
| 3,184,989 | 5/1965 | Rhodes | 74/171 |
| 3,666,034 | 5/1972 | Stuller et al. | 280/91 X |
| 3,903,983 | 9/1975 | Yeske | 280/91 X |
| 4,175,638 | 11/1979 | Christensen | 180/140 |
| 4,203,291 | 5/1980 | Youngers | 60/433 |
| 4,229,993 | 10/1980 | Andresen | 74/475 X |
| 4,358,965 | 11/1982 | Schroeder | 74/475 |
| 4,539,859 | 9/1985 | Arai et al. | 74/475 |
| 4,552,031 | 11/1985 | Barbagli | 74/491 X |

Primary Examiner—Richard Lorence
Assistant Examiner—Benjamin Levi
Attorney, Agent, or Firm—Jansson & Shupe, Ltd.

[57] ABSTRACT

The improved steering mode selector assembly includes a selector member having a slot, a carrier and a selector lever mounted on such carrier. The selector lever is movable along the slot between a first position, a second position and a third position, each of which corresponds with a selected steering mode. The lever is laterally biased in a first direction so that movement of the lever to the third position requires the lever to be manually biased in a second direction. The lever is thereby substantially prevented from being inadvertently moved to the third position.

16 Claims, 3 Drawing Sheets

5,144,857

STEERING MODE SELECTOR ASSEMBLY

FIELD OF THE INVENTION

This invention is related generally to selector assemblies and, more particularly, to such an assembly used for selecting one of several available vehicle steering modes, e.g., front wheel steering, four wheel radial steering and four wheel crab steering.

BACKGROUND OF THE INVENTION

Certain types of wheeled vehicles, especially those used for off-highway applications such as agriculture and construction, are designed to be steered in any one of several steering modes. Front-wheel-only steering is usually preferred when transporting the vehicle from place to place at higher speeds since it imparts a familiar steering characteristic not unlike that of an automobile. On the other hand, the availability of four-wheel-radial steering and crab steering can improve vehicle productivity.

This is so since the relatively large size of such vehicles and the small, often-obstructed spaces in which they are frequently operated make it difficult to perform certain tasks using only conventional front-wheel-only steering. Like front-wheel-only steering, four-wheel-radial steering provides a steering characteristic not radically dissimilar from that of an automobile. However, crab steering is somewhat unusual in that it causes the vehicle to move sideways simultaneously with any forward or reverse movement. Such unusual movement can be disconcerting to the vehicle operator unless the operator has deliberately selected such steering mode.

Further, operators of such vehicles are intent on maneuvering the vehicle implement, a bucket or plow for example, and must observe such implement almost continuously when the vehicle is in operation. Such operators are distracted by any need to view the steering selector assembly when selecting a different steering mode. Therefore, quick, accurate selection entirely by tactile sensing is highly preferred.

A type of steering mode selector assembly is shown in U.S. Pat. No. 4,175,638 (Christensen). The selector assembly shown therein has four positions, any one of which may be selected by movement of the assembly handle.

To move the handle between any two positions, the operator must first depress it to bring a notch into registry with a groove, then move the handle to the new position being selected and finally release it for retention in such position. Selection of a steering position in the foregoing manner may require the operator to look at the position of the steering handle while selection is being made. That is, quicker, more accurate selection of handle position will be accomplished if selection is other than entirely by tactile sensing. In the Christensen assembly, other steering characteristics may be employed in one of the aforementioned positions by rotational movement of the selector handle.

Yet another type of known steering mode selector apparatus uses a rotatable dial-type selector switch in conjunction with a rocker switch. To select a steering mode, the selector switch is first moved slightly to an unlocked position and then rotated until its pointer is in registry with a graphic indicator for the desired steering mode. With such apparatus, selection of a steering mode involves several hand movements and it is preferrable for the operator to view the rotatable selector switch to help assure that the pointer is set at the desired location.

U.S. Pat. No. 4,203,291 (Youngers) shows a type of selector embodied as a control mechanism for use with a hydraulic pump. To move the handle between any one of three positions on either side of neutral, it is first depressed to disengage pins from holes in the console and then moved to the new position while depressed. Releasing the handle causes the pins to engage other holes located at the new position. The mechanism also has a separate neutral lockout pin which must be disengaged whenever the handle is moved out of neutral. Other types of selector mechanisms are shown in U.S. Pat. Nos. 4,358,965 (Schroeder) and 3,184,989 (Rhodes).

A steering mode selector assembly which permits easy, quick selection of any one of three steering modes, which helps prevent inadvertent selection of a mode, which maintains the assembly in the selected mode and which can be readily operated using tactile sensing would be an important advance in the art.

OBJECTS OF THE INVENTION

It is an object of this invention to overcome some of the problems and shortcomings of the prior art.

Another object of this invention is to provide an improved selector assembly having three positions, each of which corresponds to a particular steering mode.

Another object of this invention is to provide an improved selector assembly wherein the selector lever is longitudinally movable along a slot having two overlapping portions slightly offset from one another.

Another object of this invention is to provide an improved selector assembly wherein the selector lever is movable along the first slot portion without lateral pivoting movement of the lever.

Yet another object of this invention is to provide an improved selector assembly wherein the selector lever is laterally biased in one direction to prevent the lever from being moved into and along the second slot portion unless the lever is manually, laterally pivoted in the opposite direction.

Another object of this invention is to provide an improved selector assembly having position-retaining means which includes a biasing component for laterally biasing the selector lever and a detent component for maintaining the lever in a position along the slot as selected by the operator.

These and other important objects will be apparent from the descriptions of this invention which follow.

SUMMARY OF THE INVENTION

The improved selector assembly permits selection of one of three steering modes including four-wheel steer, front-wheel-only steer and crab steer. The assembly is particularly useful on wheeled agriculture and construction vehicles where the availability of several steering modes improves machine maneuverability and productivity.

The improved assembly is configured in recognition of two facts. One is that front-wheel-only and four-wheel steering modes have similar characteristics insofar as vehicle handling is concerned. The other is that the crab steering mode makes the vehicle handle quite differently than either of the foregoing modes. The improved assembly permits selection of front-wheel-only and four-wheel steering modes with only longitudinal movement of the assembly lever along a slot. However, crab steering may be selected only by moving the assembly lever both laterally and longitudinally in the slot and then only in a predetermined sequence.

The improved steering mode selector assembly includes a carrier arranged for pivoting movement in a longitudinal direction and a selector lever mounted on the carrier and arranged for limited lateral pivoting movement. A selector member (which may be a panel in the operator's console) has a slot formed therein, such slot having linear first and second portions which are slightly laterally offset from one another and which overlap along a part of their lengths. The slot has a shoulder which interferes with free movement of the lever over the entire slot length.

The lever is freely movable within the confines of the slot between the first position and the second position which correspond to four-wheel-radial steer and front-wheel steer, respectively. The lever is laterally biased in a first, generally horizontal direction so that movement of the lever to the second position causes it to contact the shoulder. Because of the offset slot configuration and the presence of the shoulder, movement to the third position requires the lever to first be manually biased in a second direction to disengage the lever from the shoulder. The lever is thereby substantially prevented from being accidently moved to the third position.

In a highly preferred embodiment, the carrier is mounted for pivoting movement (e.g., longitudinally or "fore and aft") about a first axis and pivots whenever the lever is moved between any two positions. The selector lever is mounted on the carrier for limited lateral pivoting movement (e.g., side-to-side) about a second axis which is generally normal to and spaced slightly from the first axis. The carrier includes means for retaining the lever in a position selected by the vehicle operator. This position-retaining means includes a biasing component which bears against and laterally biases the selector lever and a detent component which engages detent openings and maintains the lever in a position selected by the operator. The preferred carrier has a generally tubular body and spring means confined within such body between the biasing component and the detent component. The biasing and detent components may be metal spheres urged toward and protruding from a respective end of the carrier.

The preferred assembly is arranged as a first class lever with the selector lever at the top, the first axis or "fulcrum" near the middle and the "force output" or lower part below the fulcrum. The lower part selectively actuates either of two electrical switches for selection of four-wheel-radial steer and crab steer, respectively. When front-wheel-only steer is selected, neither electrical switch is actuated.

In use, the improved assembly is mounted on a vehicle having three available steering modes, namely, a four-wheel-radial steer mode, a front-wheel-only steer mode and a crab steer mode. In a highly preferred arrangement, the four-wheel-steer mode and the first position of the selector lever correspond. Similarly, the front-wheel-only steer mode and the second position of the selector lever correspond as do the crab steer mode and the third position of the lever.

DETAILED DESCRIPTION OF PREFERRED EMBODIMENTS

The figures show the improved steering mode selector assembly 10 in accordance with the invention.

Figure 1:
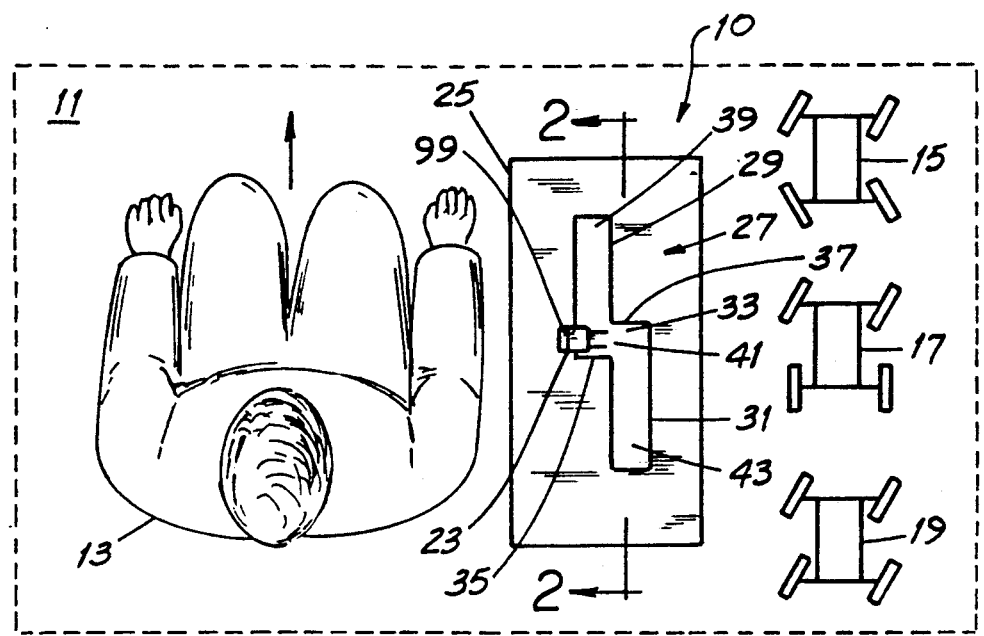
FIG. 1 is a top plan view showing the improved selector assembly in conjunction with a vehicle operator and symbols representing vehicle steering modes.

Referring first to FIG. 1, the improved assembly 10 is installed in the operator's compartment 11 of a wheeled vehicle. Preferably, the selector assembly 10 is located to the right of the operator 13 and the accompanying symbols 15, 17, 19 represent the four-wheel-radial steer mode, the front-wheel-only steer mode and the crab steer mode, respectively.

Figure 2:
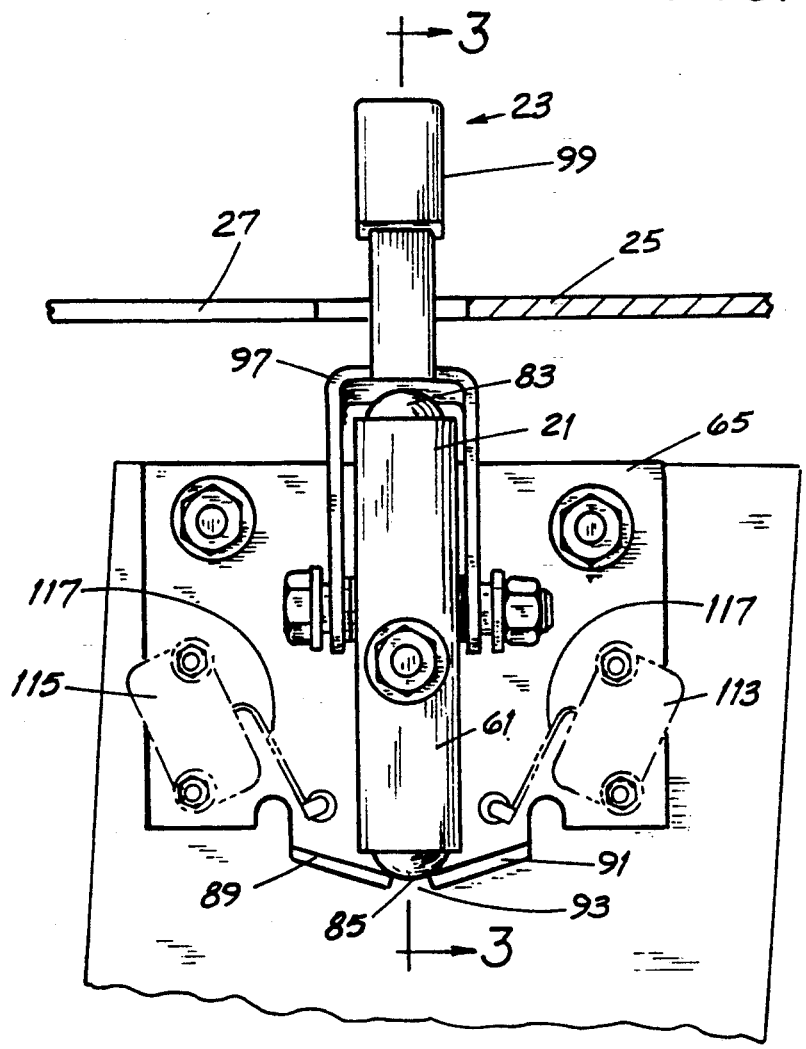
FIG. 2 is a side elevation view taken along the viewing plane 2—2 of FIG. 1 and with parts shown in phantom and other parts shown in cross-section.
Figure 3:
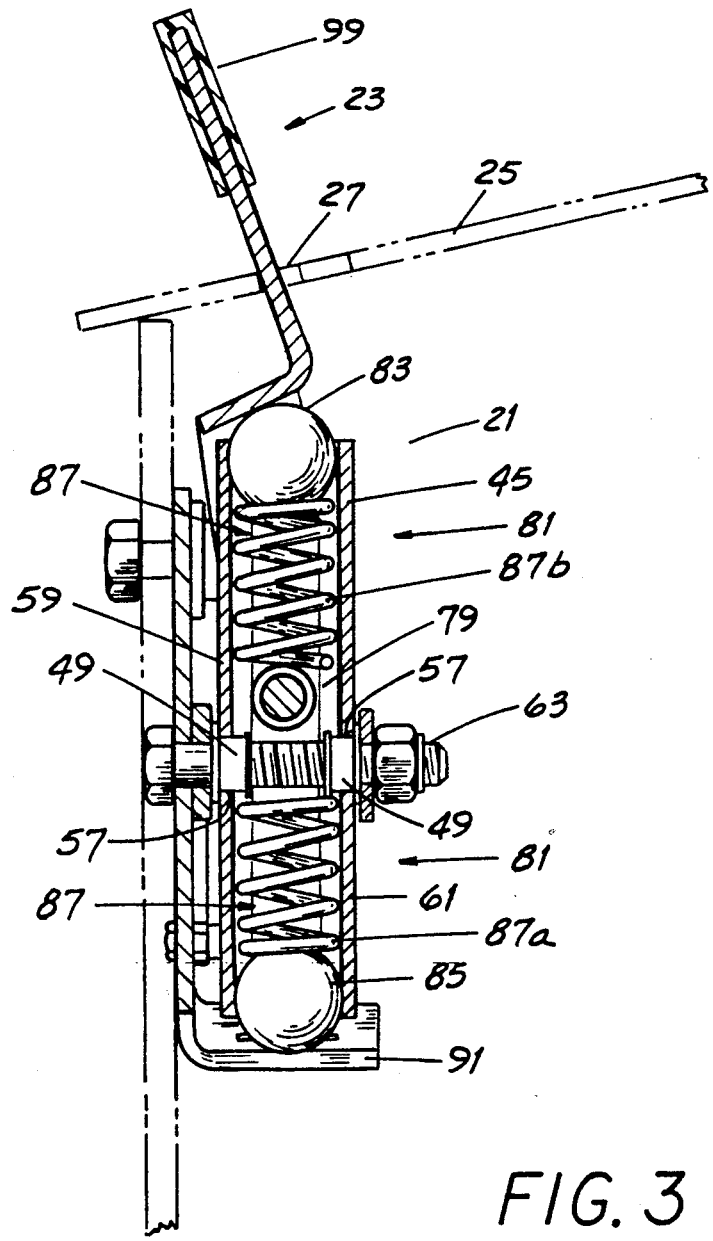
FIG. 3 is a cross-sectional elevation view taken along the viewing plane 3—3 of FIG. 2.
Figure 4:
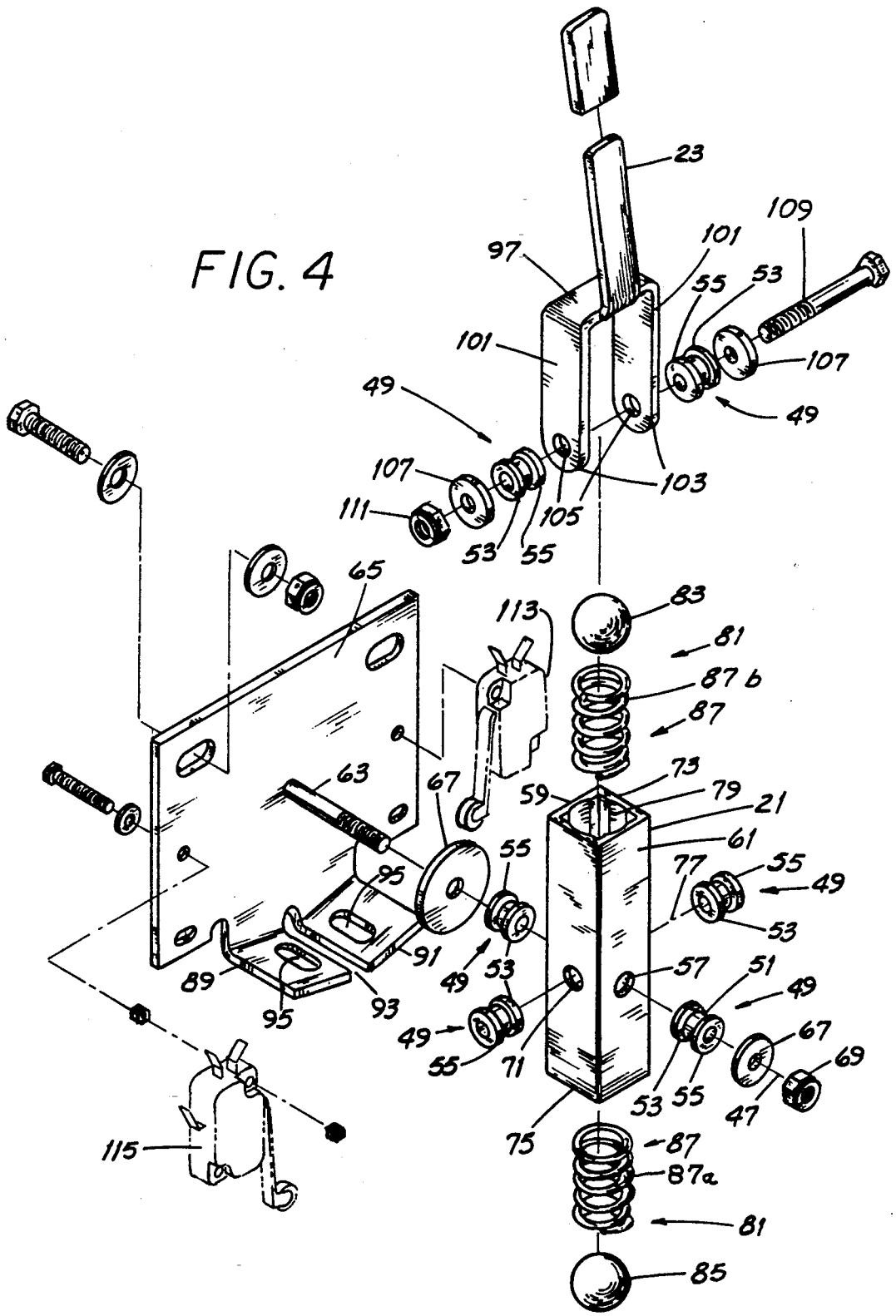
FIG. 4 is an exploded perspective view of the improved steering mode selector assembly with parts shown in phantom.

Referring additionally to FIGS. 2, 3 and 4 and by way of brief explanation, the improved selector assembly 10 includes a longitudinally pivotable carrier 21 and a laterally pivotable selector lever 23 mounted on the carrier 21. The lever 23 is laterally biased in a first direction, i.e., to the left as seen in FIG. 1. A selector member 25 has a slot 27 with a first portion 29 and a second portion 31, each of which is generally linear. The portions 29, 31 are somewhat laterally offset one to the other and overlap along a part of their lengths to form an enlarged central portion 33. The lever 23 protrudes through the slot 27 and the resulting shoulders 35, 37 interfere with free linear movement of the lever 23 over the entire slot length but not along the length of each portion 29, 31. The lever 23 is freely movable in a longitudinal direction along the slot 27 (up and down as seen in FIG. 1) between the first position 39 and the second position 41. However, movement of the lever 23 to the third position 43 requires that it first be manually biased in a second direction (to the right in FIG. 1) to avoid the shoulder 35. When so arranged, the lever 23 is substantially prevented from being inadvertently moved to the third position 43.

More particularly, the carrier 21 includes a tubular body 45 mounted for pivoting movement about a first axis 47. Mounting is by nylon pivot bearings 49, each of which has an interior bearing part 51 and end caps 53, 55 of enlarged diameter. That end cap 53 adjacent the body 45 is smaller in diameter than the end cap 55, the former being received through a hole 57 formed in the inner side 59 and in the outer side 61 of the body 45, respectively. A mounting bolt 63 extends from a mounting plate 65 through washers 67, the bearings 49 and the carrier 21, all of which are retained on the bolt 63 by a lock nut 69. The body 45 also has a hole 71 formed in its front side 73 and in its back side 75 to mount the lever 23 for pivoting movement about a second axis 77 as described in further detail below. The pivot axes 47, 77 are non-parallel and spaced from one another and in the preferred embodiment, are at 90° from one another.

The body 45 has a generally square exterior shape and an elongate, generally cylindrical interior cavity 79 which confines position-retaining means 81 therein. Such means 81 includes the biasing component 83 and the detent component 85 with compressed spring means 87 confined therebetween. Such components 83, 85 are embodied as metal spheres in the illustrated embodiment but other known types of detent components can be used.

The detent component 85 is urged downward to contact a first detent tang 89, a second detent tang 91 or a notch 93 defined intermediate the tangs 89, 91. As shown in FIG. 3, the detent component 85 is "captured" between the lower spring 87a and one or both tangs 89, 91 the latter depending upon the position of the lever 23. When the selector lever 23 is in the first position 39, the detent component 85 engages the opening 95 in the first detent tang 89. Such detent component 85 engages the opening 95 in the second detent tang 91 when the lever 23 is in the third position 43 and engages the notch 93 when the lever 23 is in the second position 41. Engagement of the detent component 85 with the notch 93 or with one of the openings 95 maintains the assembly 10 in a position selected by the operator 13.

The lever 23 includes a yoke 97, the shape of which resembles an inverted "U." A handle 99 extends upward from such yoke 97 and through the slot 27 in the selector member 25 as shown in FIGS. 2 and 3. The downwardly extending arms 101 of the yoke 97 are spaced to fit over and receive the carrier 21 with slight clearance between the front side 73, the rear side 75 and the arm 101 adjacent to each. The lower end 103 of each arm 101 has a hole 105 formed therein to receive nylon pivot bearings 49.

When reviewing the following description of the mounting arrangement of the lever 23, it is to be appreciated that those bearings 49 which are shown adjacent to and outward of the arms 101 are so shown for certain drawing clarifications. In fact, such bearings 49 are positioned between arms 101 when the lever 23 is mounted and the following description is consistent therewith.

The lever 23 is mounted for pivoting movement by insertion of two bearings 49 into the body 45, one through each hole 71 so that the smaller end cap 53 of each bearing 49 is in the cavity 79. The end caps 55, having a diameter greater than that of the holes 71 and bear against the sides 73, 75. A bearing 49 is also inserted through the hole 105 in each arm 101 so that the smaller end cap 53 of each is facing outward and the larger end cap 55 of each abuts the arm 101 and the bearings 49 in the body 45. The washers 107 are positioned and the mounting bolt 109 is thereupon inserted through the washers 107, holes 105 and bearings 49 and secured by a lock nut 111. The biasing component 83 is retained between the yoke 97 and the upper spring 87b and biases the lever 23 leftward as shown in FIGS. 1 and 3.

After appreciating the foregoing and with particular reference to FIGS. 1-4, several features will be apparent. One is that the carrier 21 pivots about the first axis 47 when the lever 23 is moved between any two positions 39, 41 and/or 43. Additionally, the selector lever 23 may be moved between the first position 39 and the second position 41 without lateral pivoting movement thereof. However, such pivoting movement is necessary to move the lever 23 between the second position 41 and the third position 43 or between the first position 39 and the third position 43.

Referring to FIGS. 1 and 2, a front electrical switch 113 and a rear electrical switch 115 are secured to the mounting plate 65. Each switch 113, 115 has an extended arm 117 for selective switch actuation by the body 45, depending upon whether the assembly 10 is in the first position 39 or the third position 43. That is, when the assembly 10 is in the first position 39, the switch 115 is actuated and the four-wheel-radial steering mode is implemented by the control system (not shown). When the lever 23 is in the third position 43, the switch 113 is actuated, thereby implementing the crab steering mode. When the assembly 10 is in the second position 41 (as shown in FIG. 2), neither switch 113, 115 is actuated and the front-wheel-only steering mode is implemented.

While the principles of this invention have been described in connection with specific embodiments, it should be understood clearly that these descriptions are made only by way of example and are not intended to limit the scope of the invention.

What is claimed is:

1. An improved steering mode selector assembly including:
   a selector assembly having a slot defining three positions, each of which corresponds to a different steering mode;
   a selector lever laterally spring-biased in a first direction and freely longitudinally movable along the slot between a first mode position and a second mode position;
   movement of the lever to a third mode position requiring manual biasing the lever in a second direction;
   whereby such lever is substantially prevented from being inadvertently moved to the third position.

2. The assembly of claim 1 wherein the slot includes a first portion and a second portion which partially overlap one another to define an enlarged central portion and wherein the lever moves laterally across such central portion when moved between the second position and the third position.

3. The assembly of claim 2 wherein the lever moves laterally across such central portion when moved between the first position and the third position.

4. The assembly of claim 3 wherein the lever may be moved between the first position and the second position while yet avoiding movement of such lever within the second portion of the slot.

5. The assembly of claim 1 wherein the carrier is mounted for pivoting movement about a first axis and wherein such carrier pivotably moves about such first axis when the lever is moved between any two of said positions.

6. The assembly of claim 5 wherein the slot includes a central portion, lateral pivoting movement of the selector lever is about a second axis and such selector lever pivotably moves about such second axis when such lever moves laterally across the central portion.

7. The assembly of claim 6 wherein the first axis and the second axis are non-parallel.

8. The assembly of claim 7 wherein the first axis and the second axis are at 90° to one another.

9. The assembly of claim 8 wherein such selector assembly defines a first class lever.

10. The assembly of claim 1 wherein the assembly is mounted on a vehicle controlled by an operator and includes means for retaining the lever in a position selected by such operator.

11. The assembly of claim 10 wherein such position-retaining means includes a detent component for engaging at least one tang, thereby maintaining the lever in the operator-selected position.

12. The assembly of claim 11 wherein such position-retaining means further includes a biasing component urged toward the selector lever by a spring, thereby laterally biasing such lever.

13. The assembly of claim 12 wherein the carrier includes a generally tubular body and wherein the position-retaining means includes spring means confined within such body between the biasing component and the detent component.

14. The assembly of claim 1 wherein such assembly is mounted on a vehicle having three steering modes including a four-wheel-radial steering mode, a front-wheel-only steering mode and a crab steering mode and wherein the vehicle is in the four-wheel-radial steering mode when the selector lever is in the first position.

15. The assembly of claim 14 wherein the vehicle is in the front-wheel-only steering mode when the selector lever is in the second position.

16. An improved steering mode selector assembly mounted on a vehicle controlled by an operator and including:
- a selector member having a slot;
- a carrier having a generally tubular body and a biasing component, a detent component engaging a tang and a spring between the components;
- a selector lever mounted on the carrier for lateral pivoting movement and laterally biased in a first direction by the biasing component urged toward the lever by the spring, thereby laterally biasing the lever;
- the lever being movable along such slot between a first position, a second position and a third position;
- the lever being movable between the first position and the second position when laterally biased in the first direction;
- movement of the lever to third position requiring biasing of the lever in a second direction;

whereby the lever is substantially prevented from being inadvertently moved to the third position.

* * * * *

UNITED STATES PATENT AND TRADEMARK OFFICE
CERTIFICATE OF CORRECTION

PATENT NO. : 5,144,857

DATED : September 8, 1992

INVENTOR(S) : Philip T. Kemper

It is certified that error appears in the above-identified patent and that said Letters Patent is hereby corrected as shown below:

```
   In column 6, line 19, delete "assembly" and insert
--member--.
```

Signed and Sealed this

Thirty-first Day of August, 1993

*Attest:*

BRUCE LEHMAN

*Attesting Officer*     *Commissioner of Patents and Trademarks*